(12) United States Patent
Wei et al.

(10) Patent No.: US 9,948,961 B2
(45) Date of Patent: Apr. 17, 2018

(54) COMPUTER-VISION BASED AUTOMATIC INSERTING AND PLAYING METHOD FOR ADVERTISEMENT

(71) Applicant: Viscovery (Cayman) Holding Company Limited, Grand Cayman (KY)

(72) Inventors: Chuan-Yong Wei, Taipei (TW); Chun-Chieh Huang, Taipei (TW); Shao-Hang Hsieh, Taipei (TW)

(73) Assignee: VISCOVERY (CAYMAN) HOLDING COMPANY LIMITED, Grand Cayman (KY)

( * ) Notice: Subject to any disclaimer, the term of this patent is extended or adjusted under 35 U.S.C. 154(b) by 0 days.

(21) Appl. No.: 15/441,225

(22) Filed: Feb. 23, 2017

(65) Prior Publication Data
US 2018/0084291 A1    Mar. 22, 2018

(51) Int. Cl.
*H04N 21/234*    (2011.01)
*H04N 21/433*    (2011.01)
*H04N 21/258*    (2011.01)
*H04N 21/81*    (2011.01)

(52) U.S. Cl.
CPC . *H04N 21/23424* (2013.01); *H04N 21/25891* (2013.01); *H04N 21/4331* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2016/0044374 A1* | 2/2016 | Ren | H04N 21/44016 725/34 |
| 2017/0099526 A1* | 4/2017 | Hua | H04N 21/812 |

* cited by examiner

*Primary Examiner* — Omar S Parra
(74) *Attorney, Agent, or Firm* — Chun-Ming Shih; HDLS IPR Services (57) ABSTRACT

A computer-vision based automatic inserting and playing method for advertisement analyzes a video for obtaining multiple shots of the video, and obtaining semantic information related to targets appearing in each shot and low-level information related to vision of each shot. Next, the method matches the semantic information and the low-level information of each two adjacent shots with other semantic information and other low-level information of candidate advertisements, so as to determine one or more insertion time points of the video, and one or more inserting advertisements respectively related to each of the insertion time points. The matching of the semantic information ensures the inserting advertisement and a front shot and a rear shot of the insertion time point are all related with each other, and the matching of the low-level information enhances visual fluency in playing and switching among the front shot, the inserting advertisement and the rear shot.

13 Claims, 7 Drawing Sheets

COMPUTER-VISION BASED AUTOMATIC INSERTING AND PLAYING METHOD FOR ADVERTISEMENT

BACKGROUND OF THE INVENTION

1. Technical Field

The technical field relates to an inserting and playing method for an advertisement, and specifically to an automatic inserting and playing method for an advertisement.

2. Description of Related Art

For a long time, advertisements have been one of the best ways for attracting consumers to purchase specific products or to attend specific activities. Following the development of the Internet, the advertisement market has become very competitive not only in the real world, but also on the Internet. Due to the maturity of network transmission technology, network advertisements have been slowly transformed from simple webpage advertisements to network video advertisements.

The current video advertisements in the market mainly comprise a pre-movie advertisement mode (so called cinema advertisement) and an inserting advertisement mode. The pre-movie advertisement mode provides and plays an advertisement in advance after receiving a request from a user for playing a video, and then plays the video after the advertisement is played completely. The inserting advertisement mode inserts and plays an advertisement when the video is played to a specific time point, and proceeds to play the remaining section of the video after the advertisement is played completely.

No matter which mode is adopted by a video website, the video website still plays the advertisements provided by an advertiser who has the advertising right. However, the video website cannot ensure the relevance of the contents between the advertisement and the video; as a result, the efficiency of the advertisement cannot be guaranteed.

Additionally, the current adopted inserting advertisement mode needs manual labor to find the time point(s) of the video for advertisements to be inserted and played (e.g., the shot where scenes are changing), and insert the advertisements to the found time point(s) afterwards, which may cause a lot of costs in time and labor. Furthermore, the inserted advertisements always show up arbitrarily to the user while the video is played, so the inserted advertisements make the user feels apathetic and may cause negative effects.

SUMMARY OF THE INVENTION

The disclosure of the present invention is directed to a computer-vision based automatic inserting and playing method for an advertisement, which may ensure the relevance among an inserting advertisement, a front shot and a rear shot of an insertion time point, and also enhance the visual fluency in playing and switching among the front shot, the inserting advertisement and the rear shot.

In one of the exemplary embodiments, the method is to analyze a video for obtaining multiple shots of the video, and obtaining semantic information related to targets appearing in each shot and low-level information related to a vision composition of each shot. Next, the method matches the semantic information and the low-level information of each two adjacent shots with other semantic information and other low-level information of candidate advertisements, so as to determine one or more insertion time points of the video, and one or more inserting advertisements respectively related to each of the insertion time points.

The embodiments of the invention match the information among each two adjacent shots and the content of the inserting advertisement, so as to determine the time point and the amount of the insertion time point of one video, and to determine the inserting advertisement that has high relevance to each insertion time point to be inserted thereof. Therefore, the embodiments ensure the inserting advertisement, the front shot and the rear shot of the insertion time point are all related with each other, so as to increase user's attention to the targets appearing in the inserting advertisement, thus improves the advertising effect.

Furthermore, the visual fluency in playing and switching among the front shot, the inserting advertisement and the rear shot of each insertion time point may be enhanced via the analysis of the low-level information, so the abrupt feeling of playing and switching between the video content and the inserting advertisement is reduced, and the user may not feel apathetic to the inserting advertisement of the video.

DETAILED DESCRIPTION OF THE INVENTION

In cooperation with the attached drawings, the technical contents and exemplary embodiments of the present invention are described thereinafter, being not used to limit its executing scope. Any equivalent variation or modification made according to appended claims is all covered by the claims claimed by the present invention.

Figure 1:
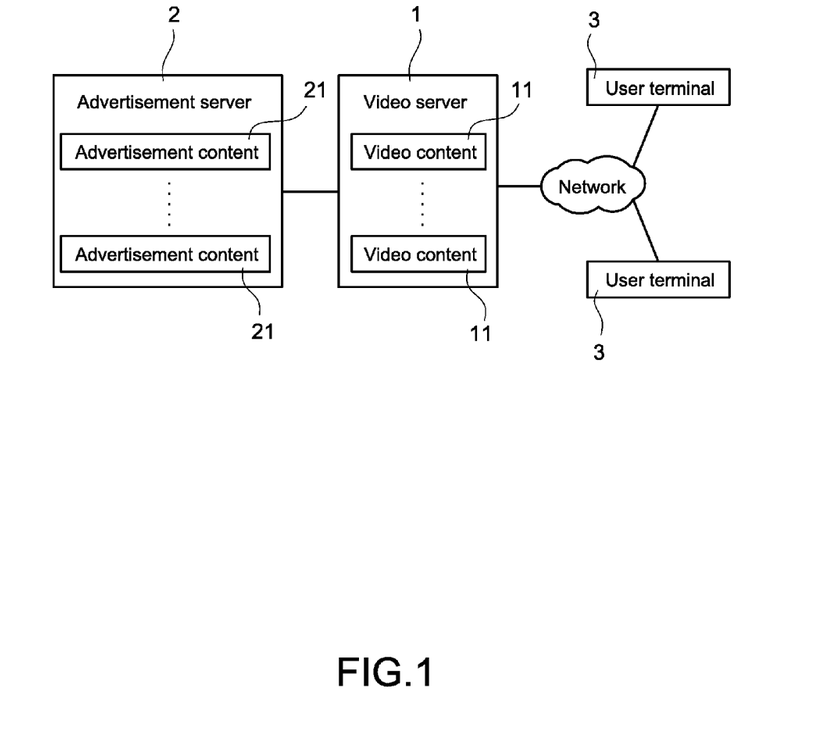
FIG. 1 is a schematic view of an advertisement inserting and playing system according to one embodiment of the invention.

FIG. 1 is a schematic view of an advertisement inserting and playing system according to one embodiment of the invention. Each of the exemplary embodiments of the invention respectively discloses a computer-vision based automatic inserting and playing method for advertisements (referred to as the method hereinafter), and the method may be adopted by an advertisement inserting and playing system (referred to as the system hereinafter) shown in FIG. 1.

The system includes a video server 1 for storing multiple video contents 11 and providing a video playing service, and the system includes an advertisement server 2 for storing multiple advertisement contents 21 and providing an advertisement playing service. The system allows a user to connect and use the services through a user terminal 3, thus, the user terminal 3 may select, access and play the video contents 11 and the advertisement contents 21 online. In one of the exemplary embodiments, each of the advertisement contents 21 is respectively pre-processed and inserted into each of the video contents 11. When playing one of the video contents 11 by the user terminal 3, a related one of the advertisement contents 21 will be played automatically once a certain condition is matched, and the video content 11 will proceed playing directly after the related advertisement content 21 is played completely.

In one aspect, the video server 1 and the advertisement server 2 may be integrated into a single server, instead of being the two independent servers as shown in FIG. 1. Also, the video server 1 and the advertisement server 2 may be implemented by distributed architecture, instead of the single server.

Figure 2:
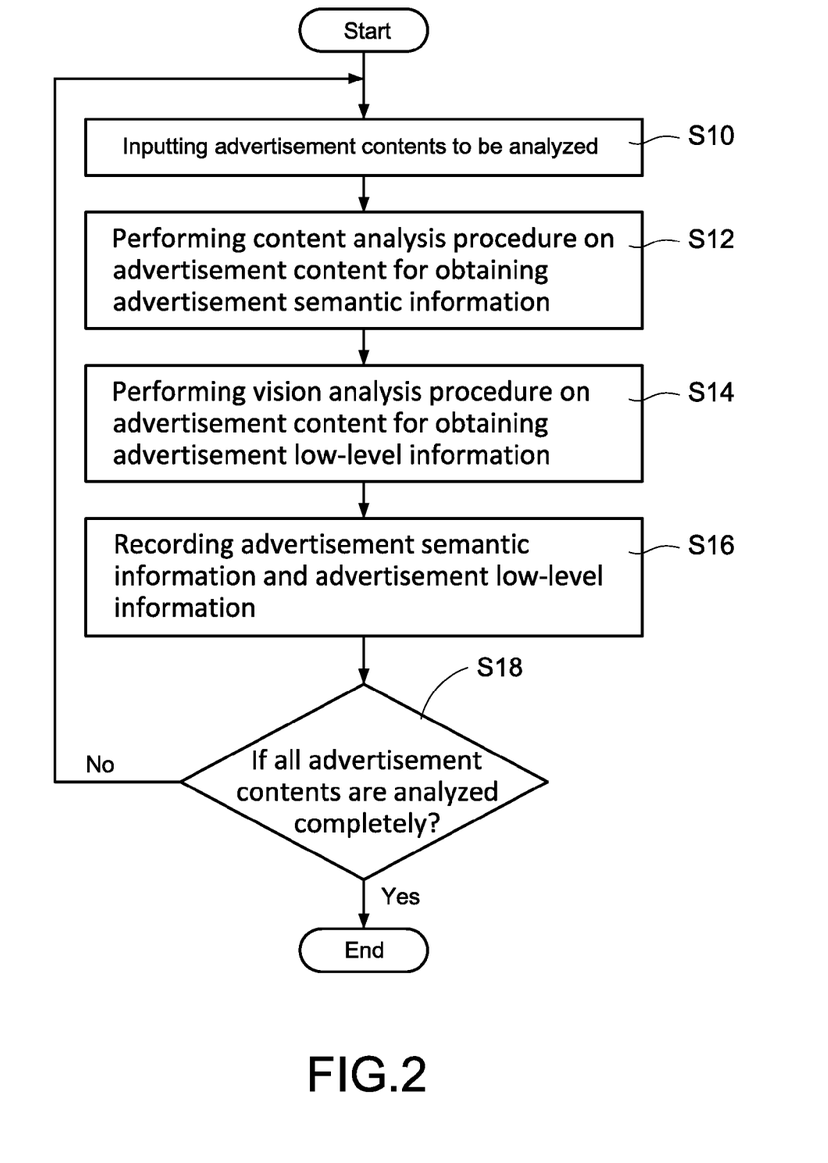
FIG. 2 is a flowchart showing advertisement content analysis according to one embodiment of the invention.

FIG. 2 is a flowchart showing advertisement content analysis according to one embodiment of the invention. One technical feature of the present embodiments of the invention is to perform an analysis procedure automatically on the video contents 11 and the advertisement contents 21 via an automatic analysis algorithm (not shown), so as to discern the relevance between each of the video contents 11 and each of the advertisement contents 21. In particular, the relevance may be relevance related to the content composition of the video contents 11 and the advertisement contents 21, and also the relevance related to the vision of the video contents and the advertisement contents.

Specifically, the present embodiments of the invention analyzes a target relevance of each video content 11 and each advertisement content 21 (i.e., if an identical target appears in the contents) and an image relevance of each video content 11 and each advertisement content 21 (i.e., if the color and the structure of the images are identical or similar in the contents). Therefore, the method determines which position(s) of each of the video contents 11 may be set as an insertion time point(s), and determines which advertisement content(s) 21 may be inserted in the set insertion time point(s). For the aforementioned analysis procedure, the method may perform a pre-processing procedure on the advertisement contents 21 inside the advertisement server 2.

As shown in FIG. 2, the automatic analysis algorithm of the method inputs one of the advertisement contents 21 to be analyzed (step S10), and then performs a content analysis procedure on the advertisement content 21 for obtaining advertisement semantic information from the advertisement content 21 (step S12). In particular, the advertisement semantic information at least records each type of target appearing in the advertisement content 21, and also records the position, the starting time and the terminating time of each target appearing in the advertisement content 21, but not limited thereto.

In one embodiment, the target may have at least six types, comprising a Face type, an Object type, a Logo type, a Scene type, a Motion type, a Text type, etc. The aforementioned step S12 performs an image identifying approach to analyze if a target, according to these six types, is appearing in the advertisement content 21 (for example, there appears a movie star (as a Face type), a cell phone (as a Object type), a coca cola icon (as a Logo type), an office (as a Scene type), etc.). However, the above six types are just embodiments of the invention, not limited thereto.

The automatic analysis algorithm of the method also performs a vision analysis procedure on the advertisement content 21 for obtaining advertisement low-level information from the advertisement content 21 (step S14). The advertisement low-level information records a vision composition of the advertisement content 21. In one aspect, the vision composition may be the computer vision that can be recognized by the automatic analysis algorithm, i.e., the advertisement low-level information may be recording the pixel information inside the advertisement content 21. In particular, the method may recognize and record the color composition and the image structure of the whole image of the advertisement content 21 (for example, the blue sky, the grey concrete, the white wall of the image), by way of reference to the pixel information.

Step S12 and step S14 mentioned before do not have an execution order, the automatic analysis algorithm may first analyze the advertisement semantic information or the advertisement low-level information alternatively, or the automatic analysis algorithm may analyze the advertisement semantic information and the advertisement low-level information at the same time through a multiplexing approach, not limited thereto.

After step S12 and/or step S14, the automatic analysis algorithm may record the advertisement semantic information and the advertisement low-level information (step S16), which are prepared for the usage of following video analysis procedures and insertion time point determinations (detailed described below). Next, the automatic analysis algorithm of the method determines whether all the advertisement contents 21 inside the advertisement server 2 are analyzed completely or not (step S18). If not, the automatic analysis algorithm re-executes step S10 to step S16 as mentioned above, so as to continue analyzing the next advertisement content 21. If yes, the automatic analysis algorithm terminates the analysis procedure.

Figure 3:
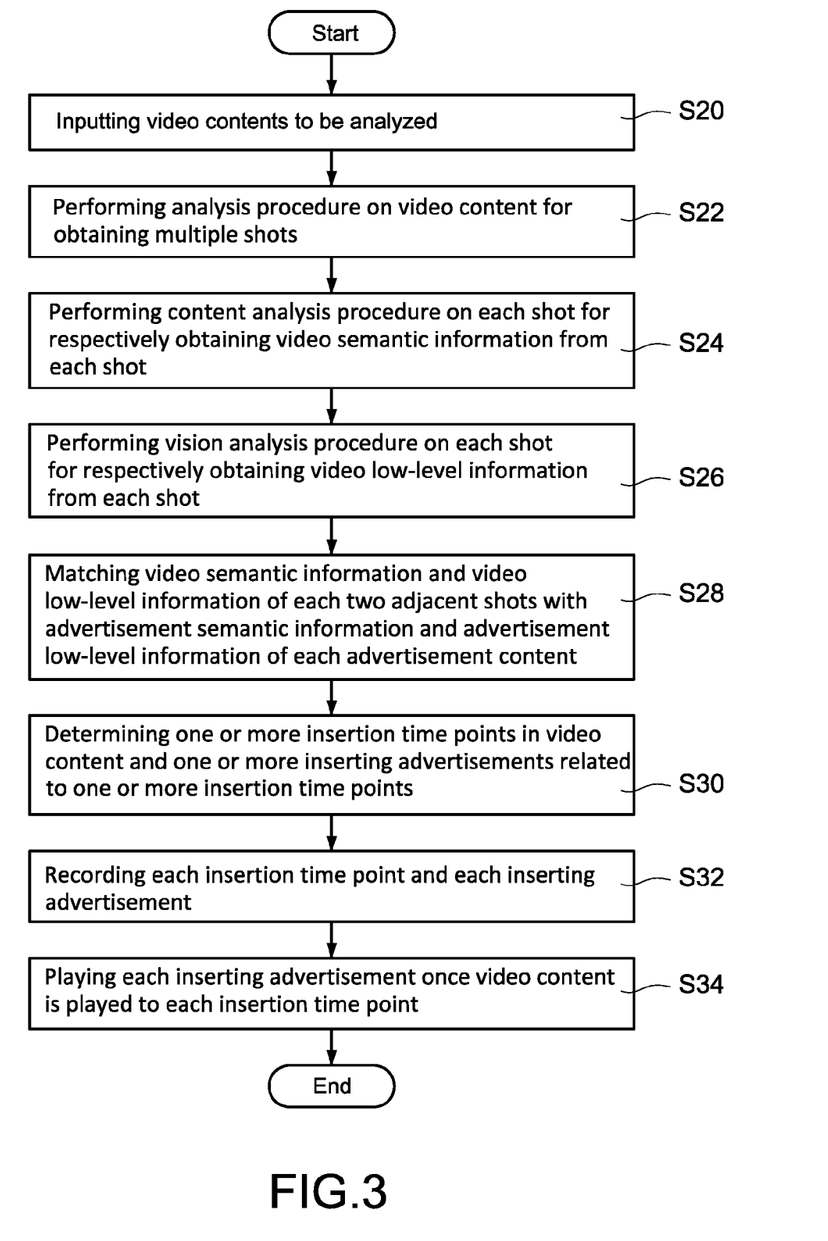
FIG. 3 is a flowchart showing video content analysis according to one embodiment of the invention.

FIG. 3 is a flowchart showing video content analysis according to one embodiment of the invention. In the embodiment shown as FIG. 3, a single video content 11 is analyzed as an example. However, in other embodiments, all the video contents 11 stored inside the video server 1 may be analyzed via the same or similar analysis approach. Also, the method may perform real-time analysis on one or more new-added video contents 11 of the video server 1 afterward.

First, the automatic analysis algorithm inputs one of the video contents 11 to be analyzed (step S20), next, it performs an analysis procedure on the video content 11 for obtaining multiple shots from the video content 11 (step S22).

In particular, the automatic analysis algorithm in each of the present embodiments of the invention analyzes the compositions of each frame of the video content 11 (for example, analyzing the pixel information included in each frame), analyzes the scenes changing based on the vision compositions, and regards the multiple frames between each scenes changing as same shot.

After step S22, the automatic analysis algorithm may obtain multiple shots of the video content 11, and performs the aforementioned content analysis procedure on each shot for respectively obtaining video semantic information from each shot (step S24). It should be mentioned that the video semantic information is similar to the aforementioned advertisement semantic information, which records a target appearing in each shot, and also records the position, the starting time and the terminating time of the target appearing in each shot. Similarly, the target here may include different types such as a Face type, an Object type, a Logo type, a Scene type, a Motion type, a Text type, etc., but not limited thereto.

The automatic analysis algorithm also performs the aforementioned vision analysis procedure on each shot for respectively obtaining video low-level information from each shot (step S26). In the embodiment, the video low-level information is similar to the aforementioned advertisement low-level information, which respectively records a vision composition of each shot, i.e., the color composition and the image structure of the whole image of each shot.

In particular, one of the exemplary embodiments of the invention may find a preferred insertion time point and an advertisement to be inserted to the preferred insertion time point via performing the analysis procedure to the vision, therefore, the visual fluency in playing and switching among a front shot of the preferred insertion time point, the inserted advertisement and a rear shot of the preferred insertion time point is enhanced (i.e, the playing is switched from the front shot of the insertion time point of the video to the inserted advertisement, and switched from the inserted advertisement to the rear shot of the insertion time point of the video, but the vision is not abrupt). Accordingly, in step S26, the automatic analysis algorithm may only analyze the frames of an engaging part of each shot that is adjacent to another shot for obtaining the video low-level information, and needs not analyze all frames of the entire shot. Therefore, the analyzing speed may be improved, and the working load of a computer (not shown) executing the automatic analysis algorithm of the method may be reduced.

It should be mentioned that step S24 and step S26 do not have an execution order, the automatic analysis algorithm may first analyze the video semantic information or the video low-level information alternatively, or the automatic analysis algorithm may analyze the video semantic information and the video low-level information at the same time through a multiplexing approach.

After step S24 and/or step S26, the automatic analysis algorithm respectively obtains the advertisement semantic information and the advertisement low-level information of each of the advertisement contents 21, and matches the video semantic information and the video low-level information of each two adjacent shots of the video content 11 with the advertisement semantic information and the advertisement low-level information of each of the advertisement contents 21 (step S28), and respectively generates a matching result for each match. Next, the automatic analysis algorithm determines one or more insertion time points in the video content 11 that is suitable for inserting an advertisement, and determines one or more inserting advertisements from the advertisement contents 21 that has relevance with the one or more insertion time points according to the matching results (step S30).

In step S28, the automatic analysis algorithm determines if identical targets appears in each two adjacent shots and each of the advertisement contents 21 or not according to the video semantic information and the advertisement semantic information. Also, in step S28, the automatic analysis algorithm determines the difference of the pixels included in each two adjacent shots and pixels included in each advertisement content 21 according to the video low-level information and the advertisement low-level information, thus, the automatic analysis algorithm can ensure the relevance between each two adjacent shots and each of the advertisement contents 21, according to the determined difference.

In particular, the exemplary embodiments of the invention basically use at least the following conditions to determine whether a position between two adjacent shots is suitable for the insertion time point or not: (1) Is an identical target, for example, a movie star, a car, a cell phone, a brand, etc., present in the two adjacent shots and any one of the advertisement contents 21; and (2) Is the vision composition of the two adjacent shots similar to the vision composition of the advertisement content 21 (for example, the colors of the visions are similar, the structures of the visions are similar, etc.).

For example, if a shot in a video shows that a leading man is driving a car away, and the next shot of the video shows that the leading man is speaking to a leading woman inside the car, that means the two adjacent shots include the identical target which is "car". Therefore, if any of the advertisement contents 21 is a car advertisement showing a car running along the street, the automatic analysis algorithm of the method will regard the position between the above two adjacent shots as one of the insertion time points and regard the car advertisement as one of the inserting advertisements having relevance with the insertion time point after performing the analysis procedure. In one aspect, when watching the video, a user may see a first image showing that the leading man is driving the car away, then see a second image showing that the car is running along the street (which is the car advertisement), and then see a third image showing that the leading man and the leading woman are speaking inside the car. Due to the high relevance of the two adjacent shots and the inserting advertisement, the feeling of abruptness in playing the inserting advertisement in the middle of the video may be reduced.

After the analysis procedure for the video content 11 is finished, the automatic analysis algorithm may record the one or more insertion time points and the one or more inserting advertisements respectively having relevance to each of the insertion time points obtained in step S28 (step S32). Therefore, when playing the video content 11 afterwards, the video server 1 may play each of the inserting advertisements once the video content 11 is played to each of the insertion time points (step S34).

In one of the exemplary embodiments, the automatic analysis algorithm of the method may generate a new video content based on the obtained insertion time point(s) and the obtained inserting advertisement(s), and stores the new generated video content in the video server 1. In the embodiment, the new generated video content is a combination of the aforementioned video content 11, the one or more insertion time points and the one or more inserting advertisements. Thus, when a user requests to play the new generated video content via the video server 1, the inserting advertisement(s) will be automatically played once the new generated video is played to the insertion time point(s).

In one embodiment, if an insertion time point has relevance to multiple inserting advertisements, the automatic analysis algorithm will adopt one of the multiple inserting advertisements that has the highest relevance to the insertion time point to insert thereto (for example, the inserting advertisement that has most numbers of the identical targets appearing in the front shot and the rear shot of the insertion time point, or the inserting advertisement that has most similar vision as the last two minutes of the front shot and/or the first two minutes of the rear shot of the insertion time point), but not limited thereto.

In another embodiment, the automatic analysis algorithm may only connect the recorded insertion time point(s) and the inserting advertisement(s) to the video content 11 (for example, recording the relationship via tables or flags). When a user requests to play the video content 11, it plays a corresponding inserting advertisement at a suitable insertion time point of the video content 11 depending on the real situation of the user (detailed described in the following).

Figure 4:
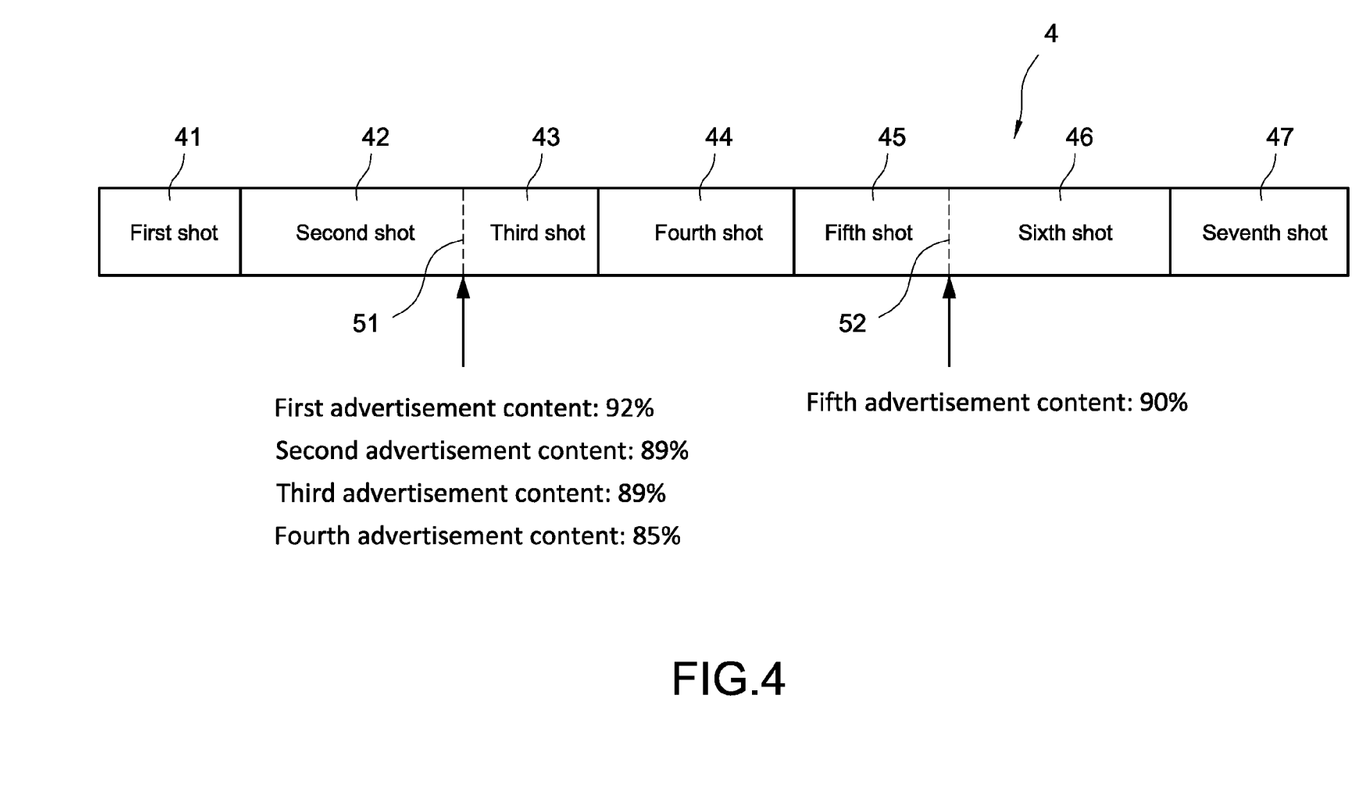
FIG. 4 is a schematic view of an analyzed video content according to one embodiment of the invention.

FIG. 4 is a schematic view of an analyzed video content according to one embodiment of the invention. FIG. 4 discloses an analyzed video content 4. In the embodiment, the automatic analysis algorithm may obtain the analyzed video content 4 after the analysis procedure including at least a first shot 41, a second shot 42, a third shot 43, a fourth shot 44, a fifth shot 45, a sixth shot 46 and a seventh shot 47. In the embodiment, a position between the second shot 42 and the adjacent third shot 43 is regarded as a first insertion time point 51, and a position between the fifth shot 45 and the adjacent sixth shot 46 is regarded as a second insertion time point 52.

In the embodiment shown in FIG. 4, the position between the first shot 41 and the adjacent second shot 42, the position between the third shot 43 and the adjacent fourth shot 44, the position between the fourth shot 44 and the adjacent fifth shot 45, the position between the sixth shot 46 and the adjacent seventh shot 47 are not suitable to be an insertion time point for each of the advertisements. In particular, the reason that a position between two adjacent shots is not suitable to be an insertion time point may be: (1) the two adjacent shots do not have an identical target; (2) the visions between the two adjacent shots are exceedingly distinct; (3) the two adjacent shots have relevance but no advertisement content 21 (which has an identical target as the two shots) can be found; (4) the two adjacent shots have relevance but no advertisement content 21 (that has the vision similar to that of the two shots) can be found.

In one aspect, the analyzed video content 4 may include one or more insertion time points, and each insertion time point may be related to one or more advertisement contents 21. As the embodiment shown in FIG. 4, the first insertion time point 51 is related to four advertisement contents 21, wherein the relevance of a first advertisement content, the second shot 42 before the first insertion time point 51, and the third shot 43 after the first insertion time point 51 is 92%, the relevance of a second advertisement content, the second shot 42, and the third shot 43 is 89%, the relevance of a third advertisement content, the second shot 42. and the third shot 43 is 89%, the relevance of a fourth advertisement content, the second shot 42. and the third shot 43 is 85%.

In one embodiment, the automatic analysis algorithm only regards the first advertisement content that has the highest relevance to the first insertion time point 51 as the inserting advertisement to be inserted to the first insertion time point 51. In another embodiment, the automatic analysis algorithm may perform a sequencing procedure on the first advertisement content, the second advertisement content, the third advertisement content and the fourth advertisement content that have the relevance higher than a threshold (such as 80%) as shown in FIG. 4. When playing the analyzed video content 4, the method automatically pauses the analyzed video content 4 and chooses one of the four advertisement contents to play on the first insertion time point 51 depending on the real situation of the user.

Also, in the embodiment shown in FIG. 4, the second insertion time point 52 is only related to a single one of the advertisement contents 21. In particular, the relevance of a fifth advertisement content, a fifth shot 45 before the second insertion time point 52, and the sixth shot 46 after the second insertion time point 52 is 90%. Accordingly, when the analyzed video content 4 is played to the second insertion time point 52, the method automatically pauses the analyzed video content 4 and plays the fifth advertisement content without performing any choosing procedures.

Figure 5:
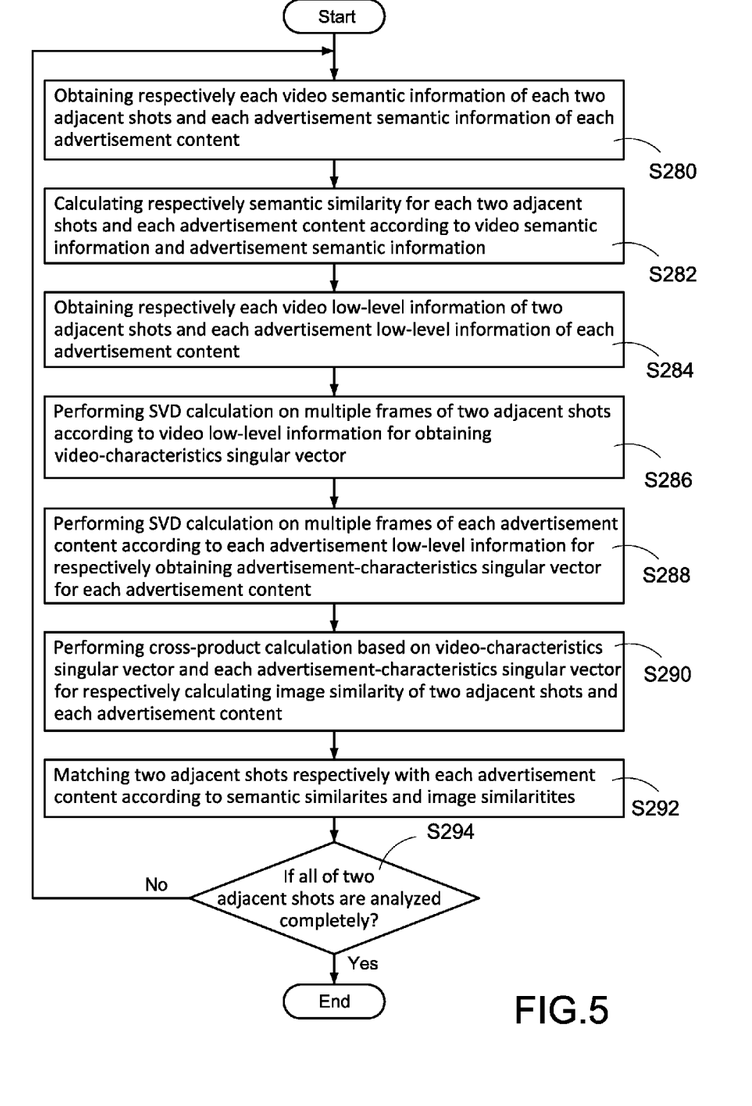
FIG. 5 is a matching flowchart according to one embodiment of the invention.

FIG. 5 is a matching flowchart according to one embodiment of the invention. FIG. 5 is used to further interpret step S28 shown in the FIG. 3, so as to clearly describe how the automatic analysis algorithm of the method matches each shot of the video content with each of the advertisement contents according to the obtained information.

As shown, after completing the analysis procedure of the video content 11 and each of the advertisement contents 21, the automatic analysis algorithm respectively obtains each video semantic information of each two adjacent shots and each advertisement semantic information of each of the advertisement contents 21 (step S280), and respectively calculates a semantic similarity for each two adjacent shots and each of the advertisement contents 21 according to the video semantic information and the advertisement semantic information (step S282).

In particular, the automatic analysis algorithm in step S282 uses an image identifying approach to determine if the two adjacent shots and each of the advertisement contents 21 appear to be identical targets or not, and then generates the sematic similarity according to the determination result. In one embodiment, the semantic similarity is a value, and the value is in proportional to the amount of the identical targets present in the two adjacent shots and each of the advertisement contents 21. In another embodiment, the semantic similarity is a Boolean value, and the semantic similarity will be set as "1" (True) if the two adjacent shots and the analyzed advertisement content 21 have at least one identical target, and be set as "0" (False) if the two adjacent shots and the analyzed advertisement content 21 do not have any identical targets.

Also, the automatic analysis algorithm further respectively obtains each video low-level information of the two adjacent shots and each advertisement low-level information of each of the advertisement contents 21 (step S284), and performs the vision analysis procedure according to the video low-level information and the advertisement low-level information.

In particular, the automatic analysis algorithm first performs a singular value decomposition (SVD) calculation to the multiple frames of the two adjacent shots according to the video low-level information, so as to obtain a video-characteristics singular vector (step S286). Next, the automatic analysis algorithm respectively performs the similar calculation to the multiple frames of each of the advertisement contents 21 (i.e., to build the same model via the SVD calculation), according to each of the advertisement low-level information, so as to respectively obtain an advertisement-characteristics singular vector for each of the advertisement contents 21 (step S288). Specifically, in step S286 and step S288, the automatic analysis algorithm uses the multiple frames at an engaging part of the two adjacent shots to calculate the video-characteristics singular vector, and uses the multiple frames at engaging parts of each of the advertisement contents 21 for engaging with the two shots to calculate the advertisement-characteristics singular vectors, but not limited thereto.

After step S288, the automatic analysis algorithm further performs a cross-product calculation based on the video-characteristics singular vector and each of the advertisement-characteristics singular vectors, so as to respectively calculate an image similarity of the two adjacent shots and each of the advertisement contents 21 (step S290). In the embodiment, the automatic analysis algorithm may first execute step S280 to step S282 for obtaining the semantic similarities or step S284 to step S290 for obtaining the image similarities alternatively. Moreover, the automatic analysis algorithm may calculate and obtain the semantic similarities and the image similarities at the same time via a multiplexing approach.

Next, the automatic analysis algorithm matches the two adjacent shots respectively with each of the advertisement contents 21 according to the semantic similarities and the image similarities (step S292). If matched successfully, the position between the two adjacent shots may be regarded as the insertion time point and related to the one or more matched advertisement contents 21. Therefore, the video providers and the advertisers don't need to manually find the insertion time points from the video content 11, and don't need to manually choose suitable advertisements to be inserted to the insertion time points. As a result, the labor cost is effectively saved.

After step S292, the automatic analysis algorithm determines if all of the two adjacent shots of the video content 11 are analyzed completely (step S294). If not, it re-executes step S280 to step S292 to keep finding usable insertion time point(s) from the video content 11. If all of the two adjacent shots are analyzed completely, the automatic analysis algorithm terminates the matching procedure, and then continues to execute step S30 as shown in FIG. 3 to record the one or more obtained insertion time points and the one or more inserting advertisements related to each of the insertion time points.

As mentioned, in each present embodiment of the invention, the automatic analysis algorithm of the method may identify whether a target of the six types such as the Face type, the Object type, the Logo type, the Scene type, the Motion type and the Text type appears in each shot and each advertisement content 21. As such, the automatic analysis algorithm of step S282 may calculate six semantic similarities for the two adjacent shots and each of the advertisement contents 21 according to the aforementioned six types.

As mentioned above, the automatic analysis algorithm of the method may calculate the six semantic similarities and one image similarity respectively for the two adjacent shots and each of the advertisement contents 21. In step S292, the automatic analysis algorithm may perform a weighted calculation based on the seven similarities including the six semantic similarities and the image similarity for generating a weighted result, and performs the matching procedure on the two adjacent shots and each of the advertisement contents 21 according to the weighted result. However, the above description is just one of the exemplary embodiments of the invention, not intended to limit the scope of the present invention.

Figure 6:
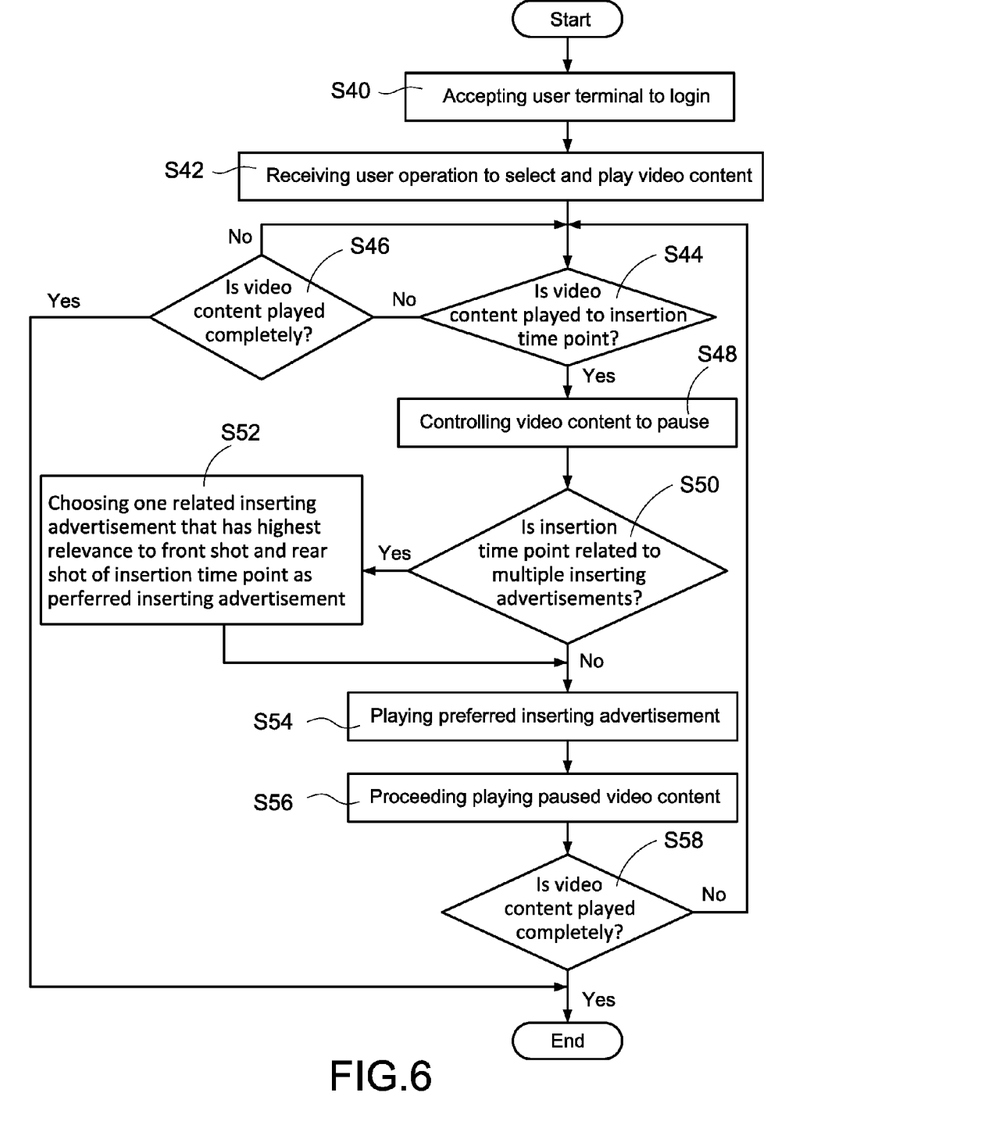
FIG. 6 is a flowchart of playing video content according to one embodiment of the invention.

FIG. 6 is a flowchart of playing video content according to one embodiment of the invention. FIG. 6 is used to further interpret step S34 shown in the FIG. 3, so as to clearly describe how the video server 1 plays the video contents 11 after the video contents 11 are analyzed completely.

First, the video server 1 accepts the user terminal 3 to login through the Internet (step S40), and receives a user operation from the user terminal 3 to select one of the video contents 11 for playing (step S42). During the playing of the selected video content 11, the video server 1 keeps determining if the video content 11 is played to an insertion time point (step S44), and determining if the video content 11 is played completely or not (step S46). If the video content 11 is not played to any insertion time point and is not finished yet, the video server 1 goes back to step S44 to keep determining. If the video content 11 is played completely, the video sever 1 terminates the playing action.

If the video content 11 is played to an insertion time point, the video server 1 controls the playing of the video content 11 to pause (step S48), and then plays the inserting advertisement related to the insertion time point after the video content 11 is paused (step S54).

As mentioned above, the insertion time point might be related to more than one inserting advertisements at the same time. In one embodiment, the video server 1 may further determine if the insertion time point is related to multiple inserting advertisements after step S48 (step S50). If the insertion time point is related to multiple inserting advertisements, the video server 1 chooses one of the related inserting advertisements that has the highest relevance to the insertion time point as a preferred inserting advertisement (step S52). In this embodiment, the video server 1 plays the preferred inserting advertisement at step S54.

During the playing of the inserting advertisement (or the preferred inserting advertisement), the video server 1 keeps determining if the inserting advertisement is played completely or not, and proceeds to play the paused video content 11 after the inserting advertisement is played completely (step S56). Next, the video server 1 determines if the video content 11 is played completely or not (step S58), and re-executes step S44 to step S56 before the video content 11 is played completely, so as to keep playing the video content 11, and playing each inserting advertisement when the video content 11 is played to each insertion time point.

Figure 7:
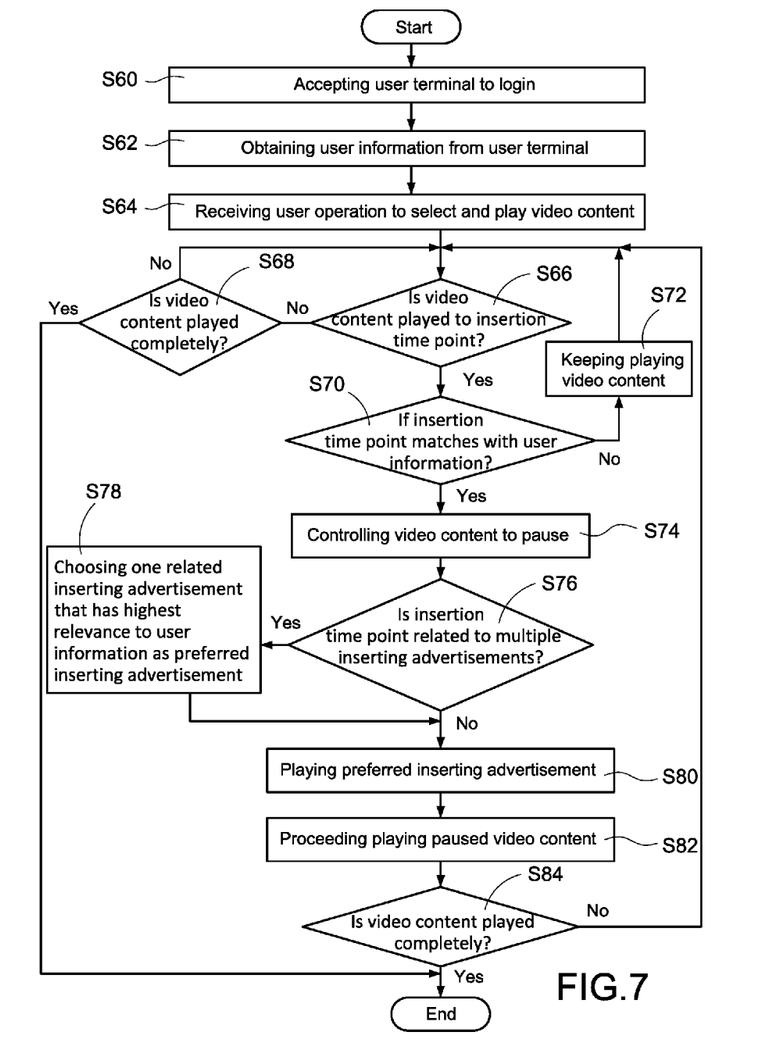
FIG. 7 is a flowchart of playing video content according to another embodiment of the invention.

FIG. 7 is a flowchart of playing video content according to another embodiment of the invention. FIG. 7 is used to further interpret step S34 shown in the FIG. 3, so as to clearly describe how the video server 1 plays the video contents 11 according to the user's identity after the video contents 11 are analyzed completely.

First, the video server 1 accepts the user terminal 3 to login through the Internet (step S60), and obtains a user information of the user from the user terminal 3 (step S62). In the embodiment, the user information may be cookies obtained from a browser of the user terminal 3, or data obtained from a data management platform (DMP), which is used to indicate possible gender, age, user behaviour, interest, etc. of the user. However, as the aforementioned cookies and DMP are well-known in the technical field, no more discussion is needed.

After step S60 and step S62, the video server 1 receives a user operation from the user terminal 3 to select one of the video contents 11 for playing (step S64). During the playing of the selected video content 11, the video server 1 keeps determining if the video content 11 is played to an insertion time point or not (step S66), and determining if the video content 11 is played completely (step S68). If the video content 11 is not played to any insertion time point and is not finished yet, the video server 1 goes back to step S66 to keep determining. If the video content 11 is played completely, the video sever 1 terminates the playing action.

If the video content 11 is played to one insertion time point, the video server 1 further determines whether the insertion time point matches with the user information (step S70). In particular, the video server 1 at step S70 determines if the target appearing in both the front shot of the insertion time point and the rear shot of the insertion time point are matching with any one of the data indicated by the user information, such as gender, age, user behaviour, interest, etc. of the user, so as to determine if the insertion time point matches with the user information or not.

If the insertion time point is not matched with the user information, the video server 1 does not pause the video content 11 and keeps playing the video content 11 (step S72). The video server 1 then goes back to step S66 to wait for the next insertion time point, until the video content 11 is played completely.

If the insertion time point does match with the user information, the video server 1 pauses the video content 11 (step S74), and plays the inserting advertisement related to the insertion time point after the video content 11 is paused (step S80).

For example, if the inserting advertisement related to a first insertion time point is a gaming advertisement, and the user information indicates that the user is over sixty years old and does not have any behaviour of gaming, the video server 1 may then skip the first insertion time point without playing the inserting advertisement after the matching procedure. Therefore, the method may help the video server 1 to avoid playing the advertisements that the user has no interest in, so as to reduce the feeling of abruptness for the user, and save the advertising cost for the advertisers.

As mentioned, the insertion time point may be related to more than one inserting advertisements. As such, the video server 1 may further determine whether the insertion time point is related to multiple inserting advertisements (step S76), and chooses one of the related inserting advertisements that has the highest relevance to the user information as a preferred inserting advertisement (step S78). In this embodiment, the video server 1 plays the preferred inserting advertisement at step S80.

In particular, the video server 1 at step S78 chooses one of the related inserting advertisements that has the highest relevance to gender, age, user behaviour, interest, etc. of the user indicated by the user information, and regards the inserting advertisement to be the preferred inserting advertisement.

For example, if the front shot of a second insertion time point includes an image showing a leading woman operating a cell phone, and the rear shot of the second insertion time point includes an image showing the leading woman inside a car and talking through the cell phone, and the user information indicates the user is a female with age between twenty to thirty years old, the video server 1 may choose a cosmetic advertisement performed by the leading woman from the multiple related inserting advertisements and plays it at the second insertion time point. For another example, if the user information indicates the user is a man with age between thirty to forty years old, the video server 1 may then choose a cell phone advertisement or a car advertisement which has the most similar vision to the two shots of the second insertion time point and plays it at the second insertion time point.

As mentioned, each present embodiment of the invention chooses the inserting advertisement to be played at the insertion time point according to the user information, so the playing of the advertisement is customized, and thus the user attention to the inserting advertisement is improved and the feeling of abruptness for the user is alleviated.

Please refer back to FIG. 7. During the playing of the inserting advertisement (or the preferred inserting advertisement), the video server 1 keeps determining if the inserting advertisement is played completely or not, and proceeds playing the paused video content 11 after the inserting advertisement is played completely (step S82). Next, the video server 1 determines if the video content 11 is played completely (step S84), and re-executes step S66 to step S82 before the video content 11 is played completely, so as to keep playing the video content 11, and plays each related inserting advertisement at each insertion time point of the video content 11.

The present embodiments of the invention perform automatic analysis for every video content and every advertisement content via the automatic analysis algorithm of the method, and obtains the insertion time point that is valuable (for example, a specific target present in both the front shot and the rear shot of the insertion time point) and may not cause the feeling of abruptness for the user (for example, the vision compositions are similar of the front shot and the rear shot of the insertion time point), and obtains the inserting advertisement that has high relevance with the insertion time point (for example, including the identical specific target and the similar vision composition to the two shots). Therefore, the labor cost may be reduced over the traditional advertising mode, and the advertising efficiency may be improved.

Also, the present embodiments of the invention match the semantic information of the two adjacent shots with the semantic information of the advertisement content, so as to ensure the inserting advertisement has high relevance to the front shot and the rear shot of the insertion time point. Therefore, the user attention to the target appearing in the inserting advertisement may be improved, and the advertising effect may be enhanced. Also, the present embodiments of the invention match the low-level information of the two adjacent shots with the low-level information of the inserting advertisement, so as to enhance the visual fluency in playing and switching from the front shot, the inserting advertisement and the rear shot, thus prevent the inserting advertisement from causing a feeling of abruptness for the user.

As a skilled person will appreciate, various changes and modifications can be made to the described embodiments. It is intended to include all such variations, modifications and equivalents which fall within the scope of the present invention, as defined in the accompanying claims.

What is claimed is:

1. A computer-vision based automatic inserting and playing method for advertisement, comprising:
   a) analyzing a video content for obtaining multiple shots from the video content;
   b) analyzing each of the shots for obtaining respectively video semantic information and video low-level information of each shot, wherein the video semantic information records a target appearing in each shot, and the video low-level information records a vision composition of each shot, wherein each of the video low-level information respectively records a color composition and an image structure of a whole image of each of the shots of the video content;
   c) obtaining respectively advertisement semantic information and advertisement low-level information of a plurality of advertisement contents, wherein the advertisement semantic information records another target appearing in each advertisement content, and the advertisement low-level information records another vision composition of each advertisement content, wherein each of the advertisement low-level information respectively records a color composition and an image structure of a whole image of each of the advertisement contents;
   d) performing a matching to the video semantic information and the video low-level information of each two adjacent shots of the video content with the advertisement semantic information and the advertisement low-level information of each of the advertisement contents for generating a matching result, and further comprising:
      d1) obtaining each of the video semantic information from the two adjacent shots and each of the advertisement semantic information from each of the advertisement contents;
      d2) calculating respectively a semantic similarity of the two adjacent shots and each of the advertisement contents;
      d3) obtaining respectively each of the video low-level information of the two adjacent shots and each of the advertisement low-level information of each of the advertisement contents;
      d4) obtaining a video-characteristics singular vectors via performing a singular value decomposition calculation to multiple frames of the two adjacent shots according to each of the video low-level information;

d5) obtaining a plurality of advertisement-characteristics singular vectors via performing the singular value decomposition calculation to multiple frames of each of the advertisement contents according to each of the advertisement low-level information;

d6) calculating an image similarity via performing a cross-product calculation based on the video-characteristics singular vectors and each of the advertisement-characteristics singular vectors; and d7) matching the two adjacent shots and each of the advertisement contents according to the calculated semantic similarities and the calculated image similarities;

e) determining one or more insertion time points of the video content, and determining one or more inserting advertisements to be related to the one or more insertion time points from the plurality of advertisement contents according to the matching result;

f) recording the one or more insertion time points and the one or more related inserting advertisements; and g) playing the one or more related inserting advertisements respectively once the video content is played to the one or more insertion time points.

2. The computer-vision based automatic inserting and playing method for advertisement in claim 1, further comprising the following steps before step a:

a01) performing respectively a content analysis procedure to the plurality of advertisement contents for obtaining each of the advertisement semantic information from each of the advertisement contents;

a02) performing respectively a vision analysis procedure to the plurality of advertisement contents for obtaining each of the advertisement low-level information from each of the advertisement contents; and a03) recording respectively the advertisement semantic information and the advertisement low-level information.

3. The computer-vision based automatic inserting and playing method for advertisement in claim 1, wherein each of the video semantic information and each of the advertisement semantic information respectively record a position, a starting time and a terminating time of the target appearing in each of the shots and each of the advertisement contents.

4. The computer-vision based automatic inserting and playing method for advertisement in claim 1, wherein step b is to analyze multiple frames of an engaging part of each of the shots for obtaining each of the video low-level information.

5. The computer-vision based automatic inserting and playing method for advertisement in claim 1, wherein step d is to determine whether the target appearing in each two adjacent shots and each of the advertisement contents according to each of the video semantic information and each of the advertisement semantic information, and to determine an image relevance among each two adjacent shots and each of the advertisement contents via comparing a difference of each pixel included in each two adjacent shots and each of the advertisement contents according to each of the video low-level information and each of the advertisement low-level information.

6. The computer-vision based automatic inserting and playing method for advertisement in claim 1, wherein step d2 is to perform an image identifying approach to determine respectively whether the two adjacent shots and each of the advertisement contents appear the identical target for generating a determination result, and to calculate the semantic similarity respectively according to the determination result.

7. The computer-vision based automatic inserting and playing method for advertisement in claim 6, wherein the target comprises six types including a face type, an object type, a logo type, a scene type, a motion type and a text type, step d2 is to calculate respectively six semantic similarities of the two adjacent shots and each of the advertisement contents according to the six type, and step d7 is to perform a weighted calculation based on the six semantic similarities and the image similarity for generating a weighted result, and to perform the matching to the two adjacent shots and each of the advertisement contents according to the weighted result.

8. The computer-vision based automatic inserting and playing method for advertisement in claim 1, wherein step g comprises following steps:

g11) accepting an operation from a user terminal to select and play the video content;

g12) controlling the playing of the video content to pause when the video content is played to any of the insertion time points;

g13) playing one of the inserting advertisements related to the insertion time point after the video content is paused;

g14) proceeding playing the video content after the inserting advertisement is played completely; and g15) re-executing step g12 to step g14 before the video content is played completely.

9. The computer-vision based automatic inserting and playing method for advertisement in claim 8, further comprising following steps:

g121) determining if the insertion time point is related to multiple inserting advertisements after step g12;

g122) selecting one of the multiple inserting advertisements that has a highest relevance to the insertion time point as a preferred inserting advertisement if the insertion time point is related to multiple inserting advertisements;

wherein, step g13 is to play the preferred inserting advertisement.

10. The computer-vision based automatic inserting and playing method for advertisement in claim 1, wherein step g comprises following steps:

g21) accepting an operation of a user terminal to select and play the video content;

g22) obtaining a user information from the user terminal;

g23) determining if the insertion time point is matched with the user information when the video content is played to any of the insertion time points;

g24) proceeding playing the video content if the insertion time point is not matched with the user information;

g25) controlling the playing of the video content to pause if the insertion time point is matched with the user information;

g26) playing one of the inserting advertisements related to the insertion time point after the playing of the video content is paused;

g27) proceeding playing the video content after the inserting advertisement is played completely; and g28) re-executing step g23 to step g27 before the video content is played completely.

11. The computer-vision based automatic inserting and playing method for advertisement in claim 10, further comprising following steps:

g251) determining if the insertion time point is related to multiple inserting advertisements after step g25;

g252) selecting one of the multiple inserting advertisements that has a highest relevance to the insertion time point as a preferred inserting advertisement if the insertion time point is related to multiple inserting advertisements;

wherein, step g26 is to play the preferred inserting advertisement.

12. The computer-vision based automatic inserting and playing method for advertisement in claim 11, wherein the user information comprises at least one of gender, age, user behaviour and interest.

13. The computer-vision based automatic inserting and playing method for advertisement in claim 12, wherein step g23 is to determine if the target appearing in a front shot and a rear shot of the insertion time point matches to at least one of gender, age, user behaviour or interest of the user information; step g252 is to select one of the inserting advertisement that has a highest relevance to gender, age, user behaviour and interest of the user information from the multiple inserting advertisements as the preferred inserting advertisement.

\* \* \* \* \*

UNITED STATES PATENT AND TRADEMARK OFFICE
CERTIFICATE OF CORRECTION

PATENT NO. : 9,948,961 B2  
APPLICATION NO. : 15/441225  
DATED : April 17, 2018  
INVENTOR(S) : Chuan-Yong Wei, Chun-Chieh Huang and Shao-Hang Hsieh Page 1 of 1

It is certified that error appears in the above-identified patent and that said Letters Patent is hereby corrected as shown below:

On the Title Page

Please add:
"(30) Foreign Application Priority Data
September 19, 2016 (TW) ............105130182"

Signed and Sealed this
Twenty-eighth Day of April, 2020

Andrei Iancu
*Director of the United States Patent and Trademark Office*